US008295684B2

(12) United States Patent
Miyaki

(10) Patent No.: US 8,295,684 B2
(45) Date of Patent: Oct. 23, 2012

(54) METHOD AND SYSTEM FOR SCALING CONTENT FOR PLAYBACK WITH VARIABLE DURATION

(75) Inventor: Ken Miyaki, Foster City, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 865 days.

(21) Appl. No.: 12/246,393

(22) Filed: Oct. 6, 2008

(65) Prior Publication Data

US 2009/0092371 A1 Apr. 9, 2009

Related U.S. Application Data

(60) Provisional application No. 60/978,316, filed on Oct. 8, 2007.

(51) Int. Cl.
*G11B 27/00* (2006.01)
*H04N 5/93* (2006.01)

(52) U.S. Cl. .................. 386/278; 386/E5.028; 386/350

(58) Field of Classification Search .................. 386/278, 386/E5.028
See application file for complete search history.

(56) References Cited

U.S. PATENT DOCUMENTS

| | | | | |
|---|---|---|---|---|
| 7,130,528 | B2 * | 10/2006 | Blair et al. | 386/344 |
| 7,142,645 | B2 * | 11/2006 | Lowe | 379/88.16 |
| 2002/0065678 | A1 * | 5/2002 | Peliotis et al. | 705/1 |
| 2005/0094965 | A1 * | 5/2005 | Chen et al. | 386/4 |
| 2007/0262995 | A1 * | 11/2007 | Tran | 345/473 |

* cited by examiner

*Primary Examiner* — Thai Tran
*Assistant Examiner* — Girumsew Wendmagegn
(74) *Attorney, Agent, or Firm* — Procopio, Cory, Hargreaves & Savitch LLP

(57) ABSTRACT

Adjusting the duration of first content having a plurality of segments including: identifying at least one segment of the first content; deleting the at least one identified segment from the first content to form modified content; and inserting transition periods between segments remaining in the modified content, wherein the transition periods are inserted to adjust the duration of the modified content to a desired duration.

13 Claims, 7 Drawing Sheets

METHOD AND SYSTEM FOR SCALING CONTENT FOR PLAYBACK WITH VARIABLE DURATION

CROSS-REFERENCE TO RELATED APPLICATIONS

This application claims the benefit of priority of co-pending U.S. Provisional Patent Application No. 60/978,316, filed Oct. 8, 2007, entitled "Scalable Content." The disclosure of the above-referenced provisional application is incorporated herein by reference.

BACKGROUND

1. Field of the Invention

The present invention relates to a rendering content, and more specifically, to scaling content to a desired duration.

2. Background

Growth of the Internet has provided users many different options in the types and scheduling of content that may be viewed or interacted with by a user. For example, users may download content for viewing at a time immediately following the download, or for storing the content and viewing it at a later time. The content that users can access from a wide area network such as the Internet can be variable in size or length, and can also be scheduled or unscheduled.

Some types of content occur, or become available, on a fixed schedule. For example, content that is provided by a broadcast network such as a television broadcast network, may occur on a fixed schedule. Typically, in a broadcast network, a particular program may begin at a fixed time, such as 7:00 pm every Tuesday evening. A user who wishes to view this particular program receives streaming video of the broadcast at the scheduled time, for example, 7:00 pm on Tuesday evening.

Because users now have access to variable length and unscheduled content, such as downloadable content, and also access to scheduled, fixed-length content such as broadcast content, the user needs to coordinate the viewing of this content. Coordination of variable and fixed length content, and scheduled and unscheduled broadcast times, may result in lapses or dead times between the end of one piece of content and beginning of a second piece of content. These gaps between the content may be undesirable or unacceptable to viewer.

In addition, some of the content may include material that a user considers objectionable. A user may wish to view the content but wants the objectionable material removed. Removable of the objectionable material will vary the length of the content which will increase the difficulties in scheduling various content that a user views and can compound the problems of lapses or gaps between the content.

Therefore, there is a need for techniques to scale content and to improve scheduling of content.

SUMMARY

Embodiments of the present invention provide for scaling the duration of media or content. In one embodiment, a method of adjusting the duration of first content having a plurality of segments is disclosed. The method includes: identifying at least one segment of the first content; deleting the at least one identified segment from the first content to form modified content; and inserting transition periods between segments remaining in the modified content, wherein the transition periods are inserted to adjust the duration of the modified content to a desired duration.

In another embodiment, a method of rendering content segments is disclosed. The method including: determining a first duration of time between an end time of a first piece of content and a start time of a second subsequent piece of content; identifying the content segments to render during the first duration of time, wherein an accumulated time of the content segments is identified to be less than the first duration of time; determining an amount of time that the first duration of time exceeds the accumulated time of the content segments; and inserting transition periods to account for the amount of time that the first duration of time exceeds the accumulated time of the content segments.

In another embodiment, a method of rendering content segments having scenes is disclosed. The method including: determining a first duration of time between an end time of a first piece of content and a start time of a second subsequent piece of content; identifying the content segments to render during the first duration of time, wherein an accumulated time of the content segments is identified to be less than the first duration of time; determining an amount of time that the first duration of time exceeds the accumulated time of the content segments; and inserting transition periods between the scenes in the content segments to account for the amount of time that the first duration of time exceeds the accumulated time of the content segments.

In yet another embodiment, a computing device is disclosed. The computing device including: an input that receives commands identifying at least one selected scene to be deleted from an original piece of content; and a processor configured to: delete the at least one selected scene from the original piece of content to generate a modified piece of content, and insert transition periods between scenes remaining in the modified piece of content to adjust the duration of the modified piece of content to a desired duration.

In yet another embodiment, a computing device is disclosed. The computer device including: a processor configured to determine a first duration of time between an end time of a first piece of content and a start time of a second subsequent piece of content; an input that receives commands identifying content segments to render during the first duration of time, wherein an accumulated time of the content segments is identified to be less than the first duration of time; and wherein the processor determines an amount of time that the first duration of time exceeds the accumulated time of the content segments and inserts transition periods to account for the amount of time that the first duration of time exceeds the accumulated time of the content segments.

Other features and advantages of the present invention will become more readily apparent to those of ordinary skill in the art after reviewing the following detailed description and accompanying drawings.

DETAILED DESCRIPTION

After reading the following description it would become apparent to one skilled in the art how to implement the invention in various alternative embodiments and alternative applications. However, although various embodiments of the present invention will be described herein, it is to be understood that these embodiments are presented by way of example only, and not limitations. As such, this detailed description of various embodiments should not be construed to limit the scope or breadth of the present invention.

Figure 1:
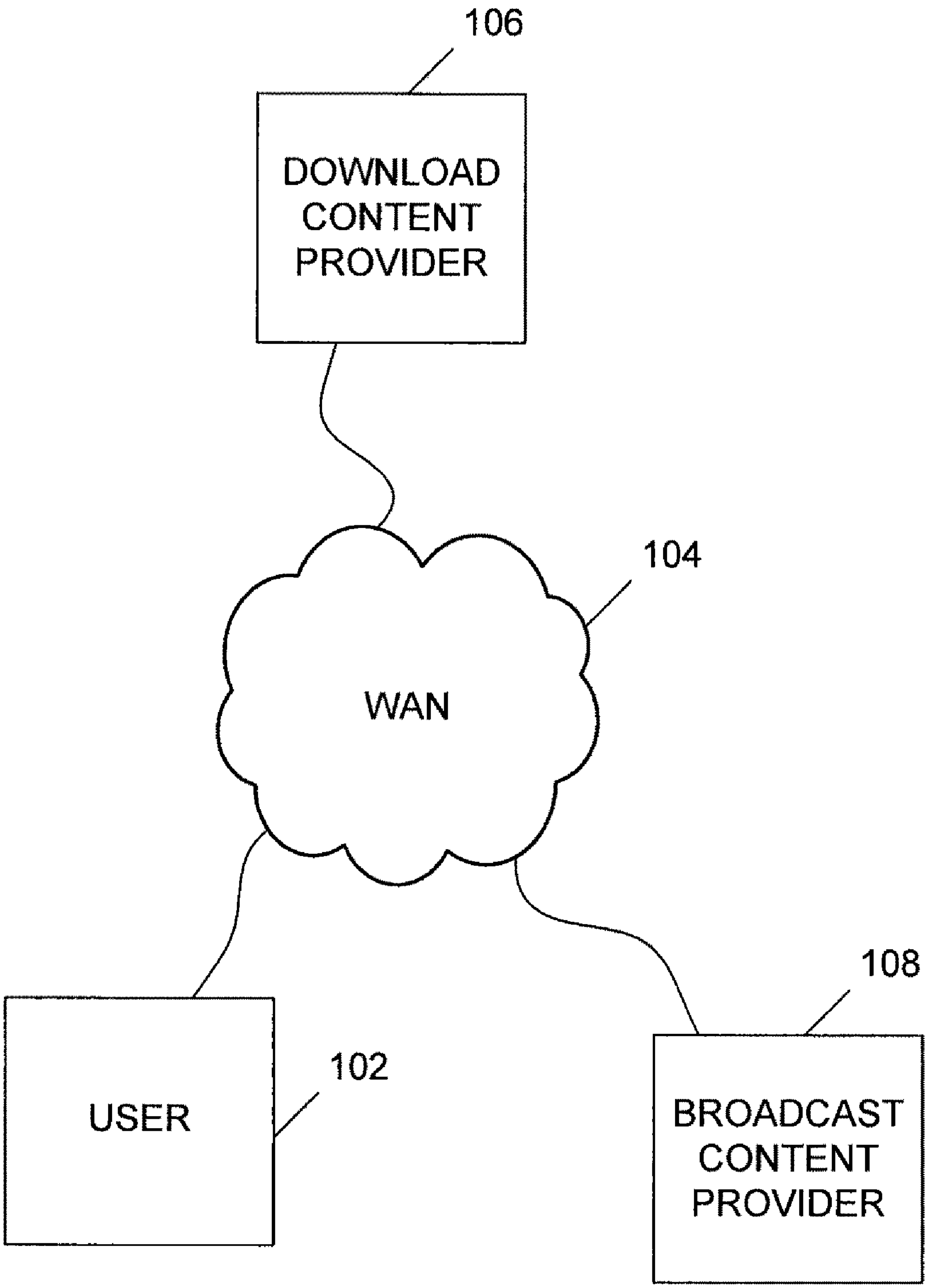
FIG. 1 is a block diagram of an embodiment of a content distribution network.

FIG. 1 is a block diagram of an embodiment of a content distribution network. As shown in FIG. 1, a user 102 can be in communication with a wide area network 104 such as the Internet. Also in communication with the wide area network 104 are content providers 106 and 108. For example, one content provider 106 can provide downloadable content that the user 102 can download and watch at a later time as selected by the user 102. Another content provider 108 can broadcast content to be streamed to the user 102 on a fixed schedule. While the content providers 106 and 108 are illustrated as providing either downloadable content or broadcast content, a content provider can provide both downloadable and broadcast content. In addition, only a single user and two content providers are illustrated in FIG. 1, but in a typical system there would be many users and many content providers. Also, content is generally described herein as viewable content, but can include any type of content, such as games, movies, music, and the like.

In one embodiment, a user 102 downloads content from the wide area network 104 and stores the content for later viewing by the user 102. The user 102 is also able to receive streaming content from a broadcast content provider 108 which is viewed on a fixed schedule when the content is broadcast or streamed. In this embodiment, the user 102 schedules the viewing of the downloadable content such that it has been completed prior to, or viewed after, the scheduled broadcast time of the broadcast content. The scheduling by the user can result in gaps of time between the two pieces of content. For example, if the downloaded content is being viewed it may end before the beginning of the scheduled broadcast content.

In another embodiment, the content downloaded from the content provider 106 or broadcast by the content provider 108 may include material that is objectionable to a particular user 102. For example, content downloaded or broadcast by content providers 106 and 108 may include love scenes, or other material, that a parent believes is undesirable for their children to watch. In this case, the parent may request that a modified version of the content be provided by the content providers 106 and 108. The content providers 106 and 108 can provide content with particular scenes deleted.

Deletion of the scenes will vary the length of the content further compounding the scheduling problem. For example, if a broadcast network content provider 108 broadcasts one show beginning at 7:00 pm and another show beginning at 8:00 pm, and a user desires to have content deleted from the broadcast beginning at 7:00 pm, that particular portion of the broadcast will end prior to the beginning of the 8:00 pm broadcast. In this situation there will be a gap of time between the end of the broadcast content at 7:00 pm and the beginning of the broadcast content at 8:00 pm. This gap in the content could, for example, result in a blank screen being displayed to user which the user would find objectionable.

Figure 2:
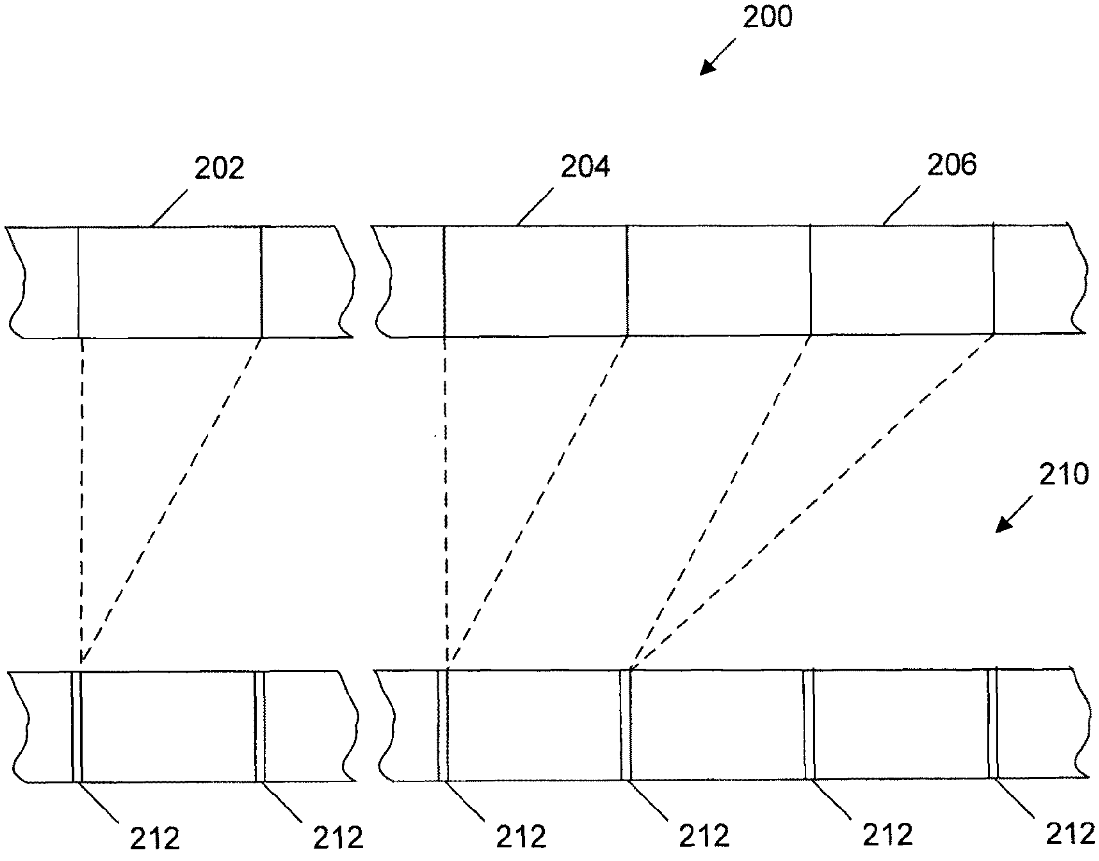
FIG. 2 is a diagram illustrating an example of adjusting the duration of a portion of content.

FIG. 2 is a diagram illustrating an example of adjusting the duration of a portion of content 200. In this example, the content includes a series of variable length clips or scenes indicated by the vertical lines in the portion of content 200. In one embodiment, the content 200 is tailored to a specific audience by editing or removing portions 202, 204 and 206 of the content 200. Even though portions of the content are removed, it is still desired that the content 200 start and finish on a set or fixed schedule. To compensate for removal of content and still maintain the fixed schedule, variable length delays as described further below will be inserted into the content. In this way the two different versions of the content stream can be synchronized to start and end at the same time. By spreading the delay out over a large number of scenes in the content, the audience will generally not be aware of the fact that their presentation is being synchronized to fixed schedule.

In one embodiment, on average, a scene may be approximately 15 seconds in duration. If a piece of content is two hours in duration, that means there will be approximately four scenes per minute for 120 minutes for a total of 480 scenes. If an extra period of time, for example, 100 milliseconds were inserted between each scene, there could be approximately 48 seconds difference in the duration of content contained in two different streams yet the two streams would begin and end at the same times. If the extra period is selected such that it is a duration that is not detectable by a typical user, for example, 100 milliseconds, the two different streams would have different durations but the difference would not be irritating, or noticeable, to the user.

For example, in one embodiment, this could be the difference between an R-rated version of a piece of content that includes three extra sexual scenes totaling approximately 48 seconds duration and a G-rated version with 100 milliseconds between each scene transition that does not include the three sexual scenes. As shown in FIG. 2, if the three sexual scenes are represented as two 15-second scenes 202, 206 and one 18-second scene 204 in content stream 200, these three scenes could be removed from content stream 200 to make a new content stream 210. The new content stream 210 does not include the sexual scenes 202, 204, and 206 and does include scene transition periods 212 inserted between each of the remaining 477 scenes.

In this example, because there are 477 100-millisecond inserts 212, this results in content stream 210 be extended an additional 47.7 seconds so that the total duration of content steam 210 is nearly the same as content stream 200 even though the modified content stream 210 has removed the two 15-second content scenes 202 and 206, and the 18-second content stream 204. In another embodiment, the duration of some of the transition periods 212 can be adjusted slightly so that the accumulated duration of all of the transition inserts 212 will be a desired period, for example, 48 seconds. In these examples, one user can watch a first content stream 200 and a second user can watch a second content stream 210 which both begin and end at the same scheduled times even though the first content stream 200 includes 48 seconds more content than second content stream 210.

Figure 3:
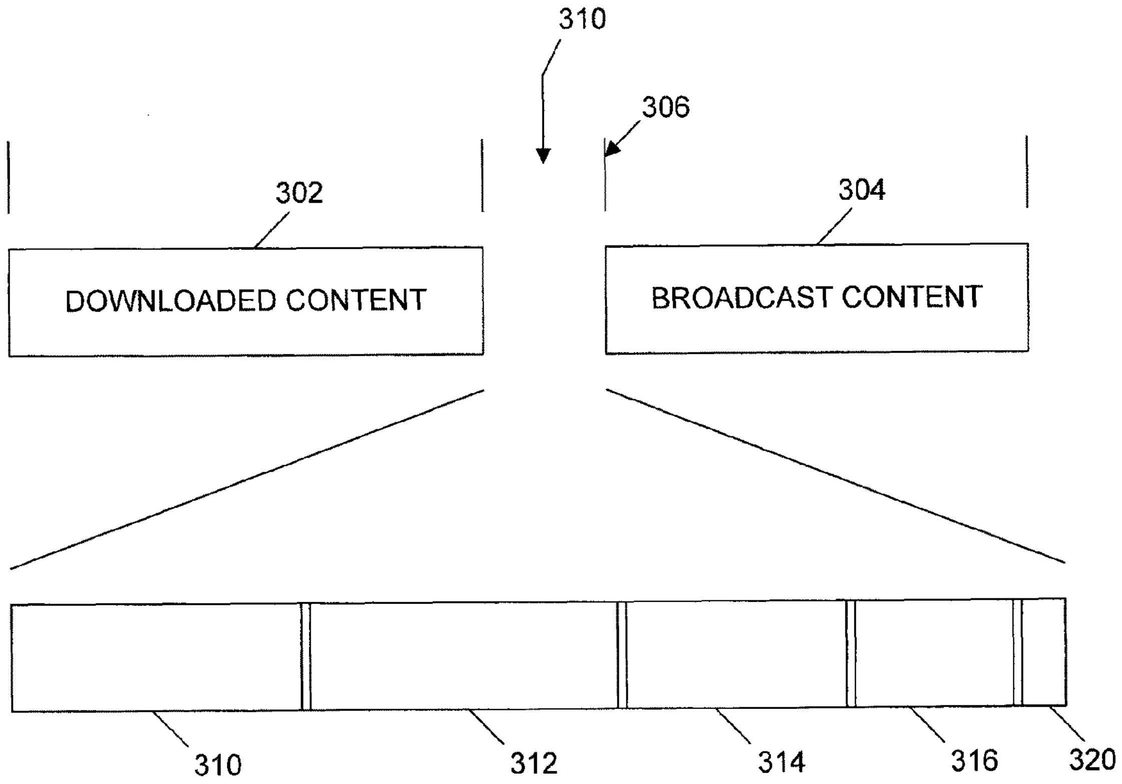
FIG. 3 is a block diagram illustrating another embodiment of adjusting the duration of content.

FIG. 3 is a block diagram illustrating another embodiment of adjusting the duration of content. In the embodiment of FIG. 3, a user has downloaded content 302 that he wishes to watch prior to the beginning at a broadcast content 304. The broadcast content 304 begins at a fixed time 306. The downloaded content 302 may end prior to the beginning of the broadcast content 304. This can result in a gap 310 between the end of the downloaded content and the beginning of the fixed schedule broadcast content 304. In the example illustrated in FIG. 3 the gap 310 may be long enough in duration for additional content to be displayed to the user. For example, the gap may be long enough to provide for advertisements, commercials, or other content, to be broadcast or presented to the user.

In one embodiment, the gap 310 may be long enough to include several commercials. Commercials are typically fixed length with periods of one minute or 30 seconds or any other fixed length desired by the broadcaster. In the example of FIG. 3, the gap 310 may be three minutes and 33 seconds long. In this example, three fixed size commercials, each one-minute in duration, 310, 312 and 314 and one thirty second duration commercial 316 can be provided to the user. In this example, there remains a 3-second period 320 at the end of the variable period 310. In one embodiment, the 3-second period 310 can be distributed throughout the gap period 310 so that the user will only see shorter duration blanks in the broadcast of the commercials. For example, the 3-second period 310 could be distributed as three one-second cut scenes, or gaps, between the commercials 310, 312, 314 and 316. In other embodiments, other distributions of time between commercials can be used to distribute and expand the content in the gap period 310 to show the entire period. In another embodiment, transition periods, or cut scenes, can be inserted between scenes in the commercials to extend the accumulated duration of the commercials 310, 312, 314, and 316 to fill, or substantially match, the duration of the gap 310.

Figure 4:
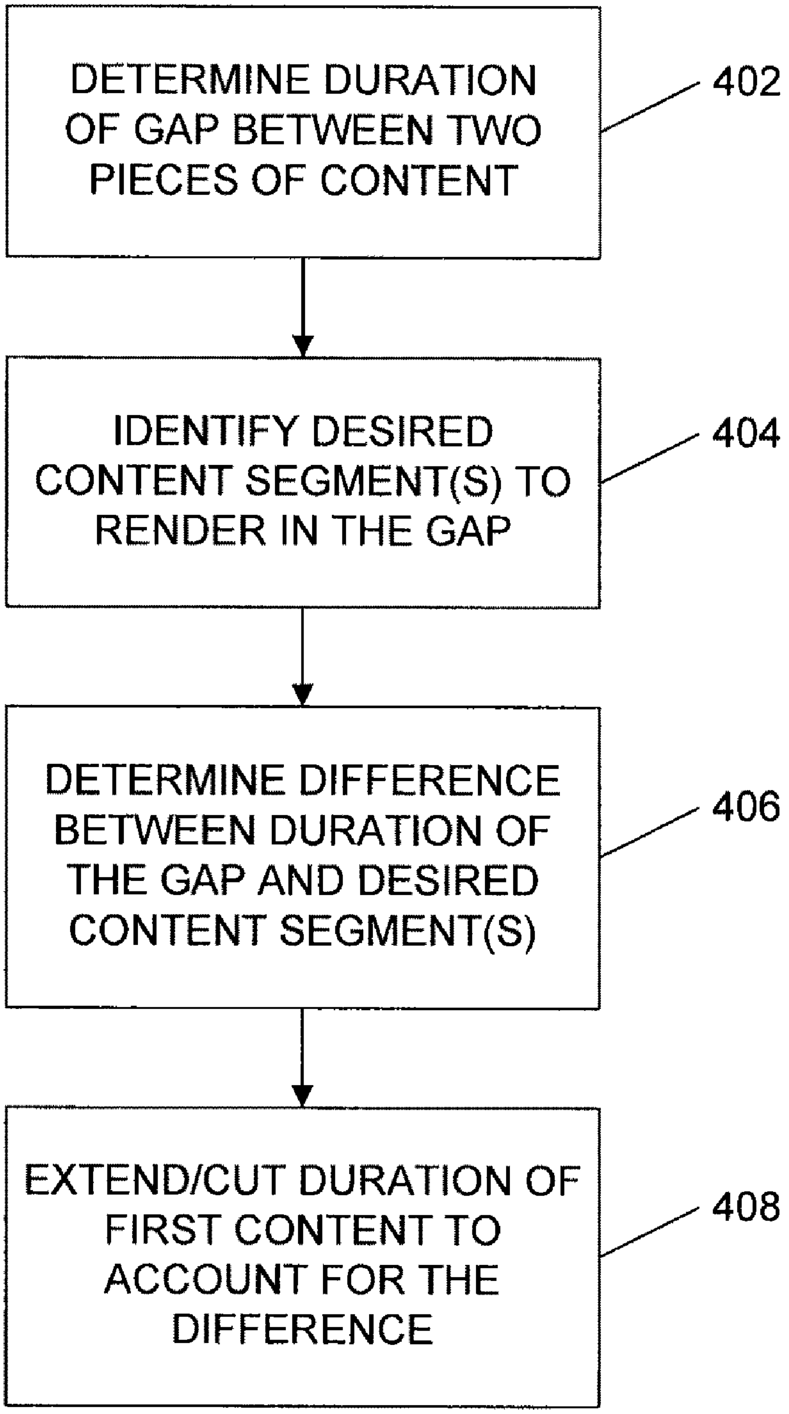
FIG. 4 is a flow diagram illustrating an embodiment of adjusting the duration of content.

FIG. 4 is a flow diagram illustrating an embodiment of adjusting the duration of content. At block 402, the duration of time between the end time of a first piece of content and the start time of a second subsequent piece of content is determined. For example, the first piece of content could be variable in length and a user can select a start time while the second piece of content may be broadcast to the user on a fixed schedule. In this example, the duration between the end of the first piece of content and the beginning of the second piece of content is variable. Content segments that are desired to be rendered between the two pieces of content are then identified, at block 404. For example, the content segments could include advertisements, commercials, or other types of content to be broadcast to a user.

At block 406, the amount of time that the duration between the two pieces of content exceeds the total accumulated time of the content desired to be rendered between the pieces of content is determined. For example, the first content stream may end three minutes and 33 seconds before the second content stream. It may be desired to render three minutes and 30 seconds worth of commercials during that period. This will result in the duration of the period between the first and second content stream exceeding the desired content by three seconds.

At block 408, transition periods, or cut scenes, are added to the first piece of content to add or extend the duration of the first piece of content to account for the amount of time that the duration exceeds the accumulated time of the desired content. For example, transition periods can be added to the first piece of content to extend its time. In an alternative embodiment, transition periods can be added in gaps between the desired content and the first and second pieces of content. Likewise, in another embodiment, transition periods can be added to the commercial content itself to extend each of the commercials by a desired amount of time.

Figure 5:
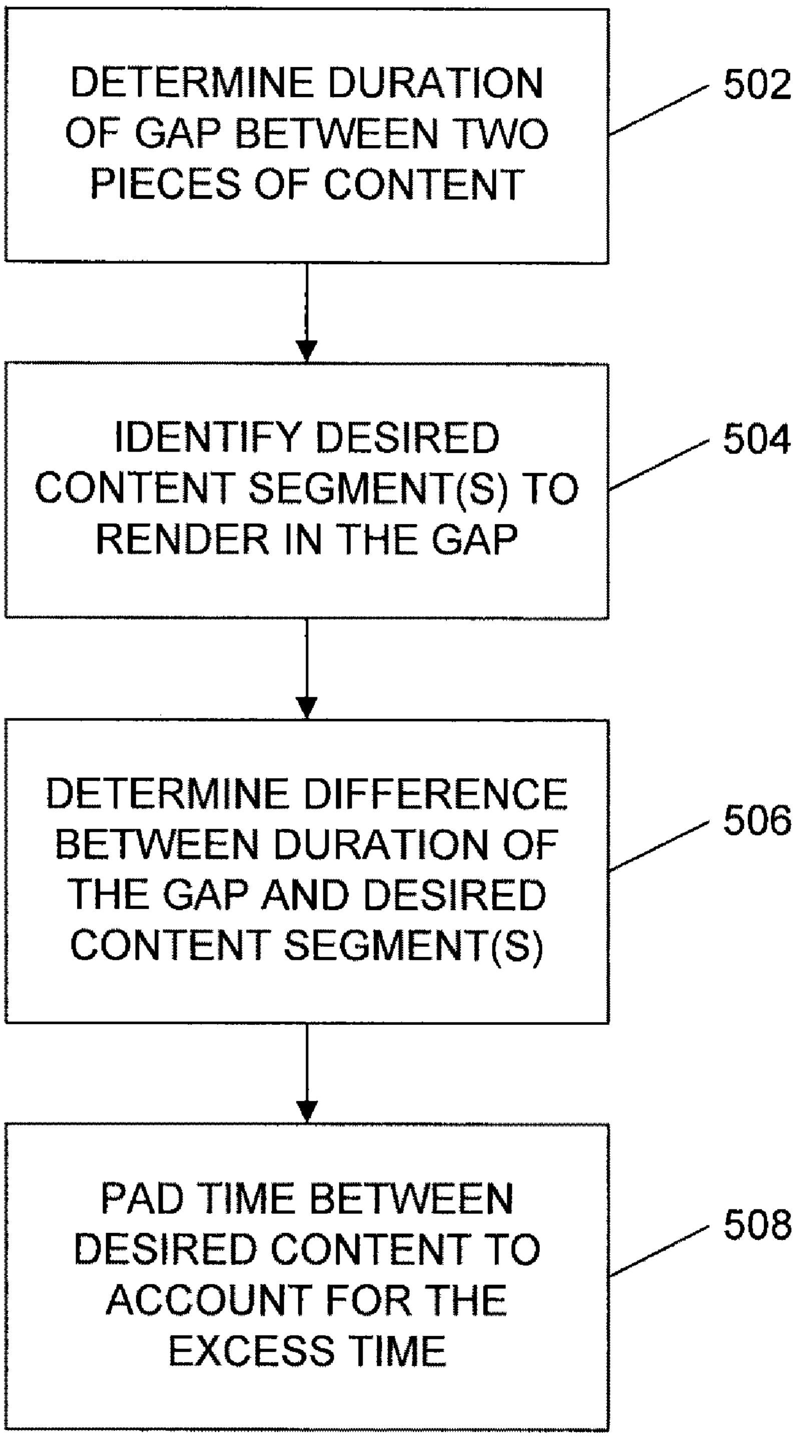
FIG. 5 is a flow diagram of another embodiment of adjusting the duration of content.

FIG. 5 is a flow diagram of another embodiment of adjusting the duration of content. In the embodiment of FIG. 5, duration of time between the end of the first piece of content and the beginning of a second subsequent piece of content is determined, at block 502. At block 504, desired content segments to render between the two pieces of content are identified. An amount of time that the duration between the first and second piece of content exceeds the total accumulated time of the desired content segments to render is then determined, at block 506. Then, at block 508, transition periods, or scenes, are used to pad between scenes in the first piece of content to extend the duration of the first piece of content to account for the amount of time that the duration between the first and second pieces of content exceeds the accumulated time of the content desired to show between the first and second pieces of content.

Figure 6:
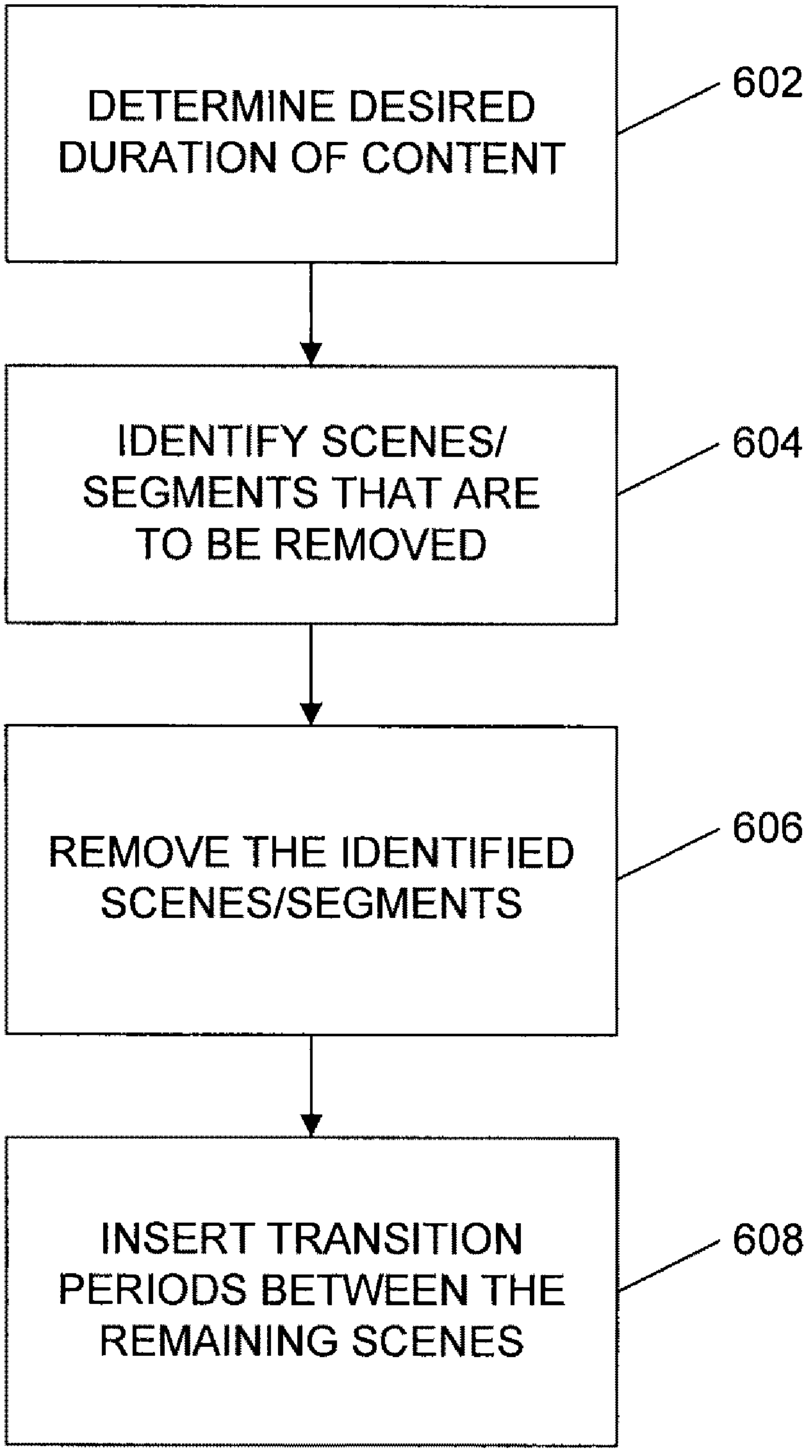
FIG. 6 is a flow diagram of another embodiment of adjusting the duration of content.

FIG. 6 is a flow diagram of another embodiment of adjusting the duration of content. In the embodiment of FIG. 6, duration of time for a piece of content is determined, at block 602. Then, at block 604, scenes that are to be removed from the content are identified. For example, a user may identify particular scenes (or category or types of scenes) that the user does not want to have as part of the received or viewed content. The identified scenes are removed from the content, at block 606, and transition periods, or cut scenes, are inserted between the remaining scenes in the content, at block 608, so that the overall duration of the content with deleted scenes is a desired duration. In one example, the desired duration is a duration that is the same, or substantially the same, as the original content that included the scenes.

Figure 7:
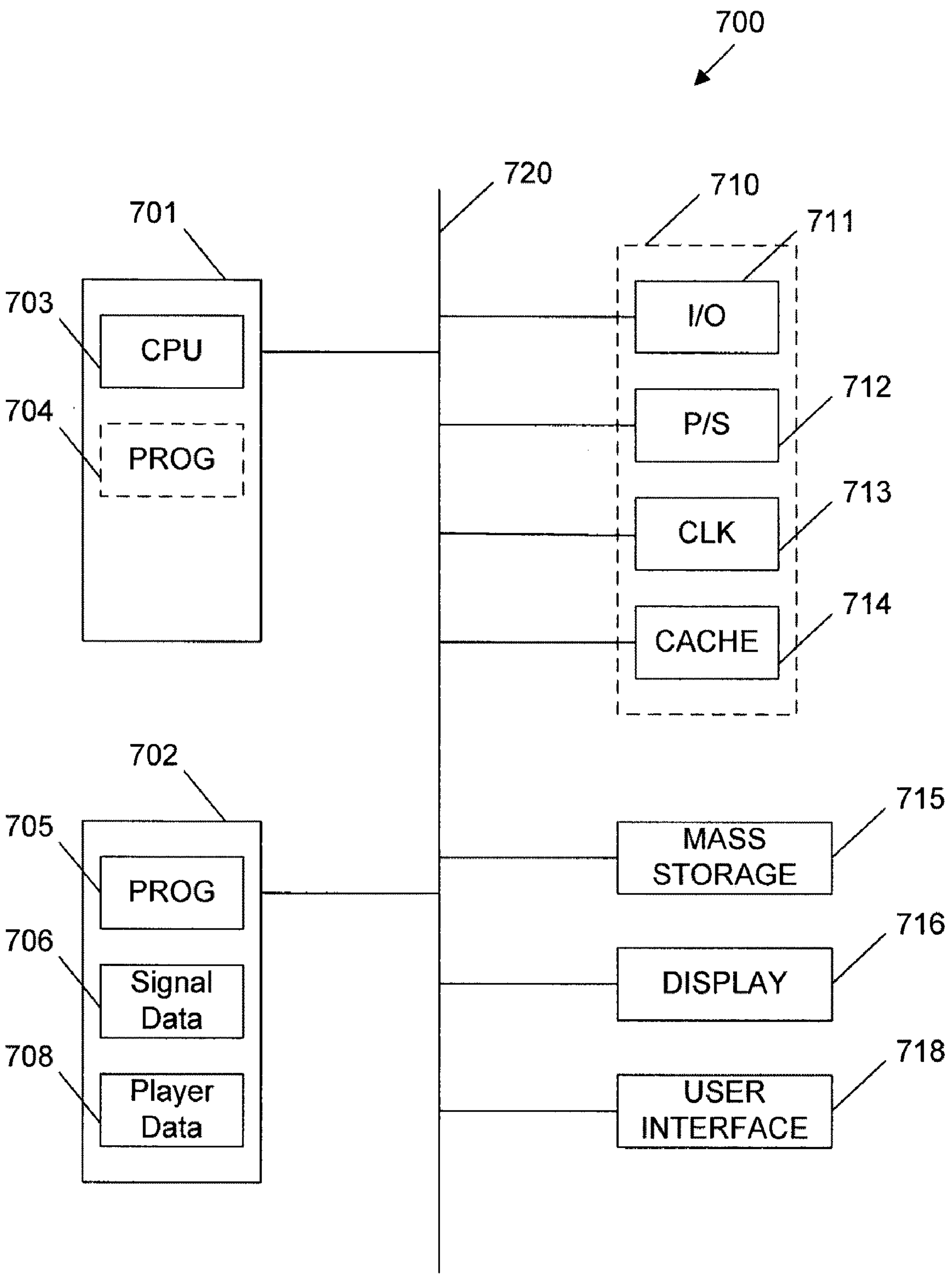
FIG. 7 is a block diagram of a computing system, such as a computer, game console, or set-top box, that may be used to implement various embodiments described herein.

FIG. 7 is a block diagram of a computing system 700, such as a computer, game console, or set-top box, that may be used to implement various embodiments described herein. As shown in FIG. 7, the computing system 700 may include a processor module 701 and a memory module 702. In one embodiment, memory module 702 may be RAM, DRAM, ROM and the like. In addition, the computing system 700 may have multiple processor modules 701 if parallel processing is to be implemented. The processor module 701 can include a central processing unit 703. In addition, the processor module 701 can include local storage or a cache 704 to store executable programs. The memory module 702 can include program storage 705. In addition, the memory module 702 can include signal data storage 706 and player data storage 708

The system 700 may also include well-known support function module 710 such as input/output elements 711, power supplies 712, a clock 713, cache memory 714, and the like. The system 700 may also optionally include mass storage module 715 such as a disc drive, CD ROM drive, DVD drive, tape drive or the like to store programs and/or data. The system 700 may also optionally include a display module 716 as well as a user interface module 718 to facilitate interaction between the system 700 and the user. Display module 716 may be in the form of a cathode ray tube, a flat panel screen or any other display module. The user interface module 718 may include a keyboard, mouse, joystick, write pen or other device such as a microphone, video camera or other user input device. The processor, memory, and other components within the system 700 may exchange signals such as code instructions and data with each other via a system bus 720.

Various embodiments described may be implemented primarily in hardware, or software, or a combination of hardware and software. For example, a hardware implementation may include using, for example, components such as application specific integrated circuits ("ASICs"), or field programmable gate arrays ("FPGAs"). Implementation of a hardware state machine capable of performing the functions described herein will also be apparent to those skilled in the relevant art.

The term "module" as used herein means, but is not limited to a software or hardware component, such as an FPGA or an ASIC, which performs certain tasks. A module may advantageously be configured to reside on an addressable storage medium and configured to execute on one or more network enabled devices or processors. Thus, a module may include, by way of example, components, processes, functions, attributes, procedures, subroutines, segments of program code, drivers, firmware, microcode, circuitry, data, databases, data structures, tables, arrays, variables, and the like. The functionality provided for in the components and modules may be combined into fewer components and modules or further separated into additional components and modules. Additionally, the components and modules may advantageously be implemented to execute on one or more network enabled devices or computers.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. Thus, the invention is not intended to be limited to the embodiment shown herein but is to be accorded the widest scope consistent with the principal and novel features disclosed herein.

What is claimed is:

1. A method of rendering content segments, the method comprising:

determining a first duration of time between an end time of a first piece of content and a start time of a second subsequent piece of content;

identifying the content segments to render during the first duration of time, wherein an accumulated time of the content segments is identified to be less than the first duration of time;

determining an amount of time that the first duration of time exceeds the accumulated time of the content segments; and inserting imperceptible transition periods between the content segments to account for the amount of time that the first duration of time exceeds the accumulated time of the content segments, wherein the transition periods are spread out to make them unnoticeable.

2. The method of claim 1, wherein said inserting transition periods comprises inserting transition periods within the first piece of content.

3. The method of claim 1, wherein said inserting transition periods comprises inserting transition periods within gaps between the contents segments and the first and second pieces of content.

4. The method of claim 1, wherein the content segments are advertisements.

5. The method of claim 1, wherein the second piece of content is delivered at a fixed schedule.

6. The method of claim 1, wherein the second piece of content comprises broadcast content.

7. The method of claim 6, wherein the broadcast content comprises television network broadcast content.

8. A method of rendering content segments having scenes, the method comprising:

determining a first duration of time between an end time of a first piece of content and a start time of a second subsequent piece of content;

identifying the content segments to render during the first duration of time, wherein an accumulated time of the content segments is identified to be less than the first duration of time;

determining an amount of time that the first duration of time exceeds the accumulated time of the content segments; and inserting imperceptible transition periods between the scenes in the content segments to account for the amount of time that the first duration of time exceeds the accumulated time of the content segments, wherein the transition periods are spread out to make them unnoticeable.

9. The method of claim 8, wherein the content segments are advertisements.

10. The method of claim 8, wherein the second piece of content is delivered at a fixed schedule.

11. The method of claim 8, wherein the second piece of content comprises broadcast content.

12. The method of claim 11, wherein the broadcast content comprises television network broadcast content.

13. A computing device comprising:

a processor configured to determine a first duration of time between an end time of a first piece of content and a start time of a second subsequent piece of content;

an input that receives commands identifying content segments to render during the first duration of time, wherein an accumulated time of the content segments is identified to be less than the first duration of time; and wherein the processor determines an amount of time that the first duration of time exceeds the accumulated time of the content segments and inserts imperceptible transition periods into the first piece of content to account for the amount of time that the first duration of time exceeds the accumulated time of the content segments, wherein the transition periods are spread out to make them unnoticeable.

* * * * *